United States Patent

[11] 3,597,018

| [72] | Inventor | Yutaka Masaoka |
| | | Hamakita-shi, Japan |
| [21] | Appl. No. | 823,060 |
| [22] | Filed | May 8, 1969 |
| [45] | Patented | Aug. 3, 1971 |
| [73] | Assignee | Yamaha Hatsudoki Kabushiki Kaisha |
| | | Hamakita-shi, Shizuoka-ken, Japan |
| [32] | Priority | May 9, 1968 |
| [33] | | Japan |
| [31] | | 431/30789 |

[54] ENDLESS-BELT TRACTION VEHICLE
5 Claims, 6 Drawing Figs.

[52] U.S. Cl............................................. 305/35,
180/5 R, 180/9.64
[51] Int. Cl............................................. B62m 27/02,
B62d 55/12
[50] Field of Search............................................. 305/35 EB;
152/176, 323, 52, 357; 74/243; 180/5, 9.64

[56] References Cited
UNITED STATES PATENTS

| 1,292,345 | 1/1919 | Martin............................ | 152/52 |
| 3,208,500 | 9/1965 | Knipp............................ | 152/357 X |
| 3,236,568 | 2/1966 | Bombardier.................... | 180/5 X |
| 3,261,646 | 7/1966 | Pax................................ | 305/35 |
| 3,300,835 | 1/1967 | Barr............................... | 74/243 X |
| 3,362,492 | 1/1968 | Hansen.......................... | 180/5 |

*Primary Examiner*—Richard J. Johnson
*Attorney*—Irving M. Weiner

ABSTRACT: At least one of the sprocket wheels provided in an endless-belt traction vehicle involves an outer ring, and an inner ring of natural or synthetic elastomeric resin having an axial bore into which is securely inserted an axle carried on the vehicle body. Said outer ring is attached to the axle by means of fixing members in a manner to be radially movable, though immovable in the rotating direction of the axle.

ENDLESS-BELT TRACTION VEHICLE

BACKGROUND OF THE INVENTION

This invention relates to an endless-belt traction vehicle, and more particularly to an endless-belt traction vehicle having sprocket wheels which can absorb impacts transmitted from the ground.

It has been known that the sprocket wheel of the prior art endless-belt traction vehicle comprises a metal wheel having a rim and an axial bore into which an axle is securely inserted, an annular body of fabric-reinforced rubber having sprocket teeth, and means for rigidly fitting said body with said rim. Although the flexibility of the annular body protects said sprocket wheel from being broken at the teeth by impact with hard objects protruding from the ground, it has been impossible to absorb the impacts, which are concentrated at a portion of axle where said metal wheel is mounted, sufficiently to prevent the axle and frame from being damaged.

SUMMARY OF THE INVENTION

An object of this invention is to provide an endless-belt traction vehicle having at least one improved sprocket wheel fixed to the axle with its flexibility preserved with respect to the axle.

Therefore, the endless-belt traction vehicle of this invention comprising at least one endless track belt having openings serially arranged along the length thereof, more than two sprocket wheels interlocked with said openings, any one of which can drive said endless track belt, axles fitting in with the axial bores of said sprocket wheels respectively, and means for fixing the sprocket wheels to the axles, is characterized in that at least one of said sprocket wheels involves an outer ring of natural or synthetic elastomeric resin having a sufficiently great rigidity to endure loads applied when the endless track belt is driven, and an inner ring of natural or synthetic elastomeric resin having a sufficient flexibility to absorb impacts applied thereto in a substantially radial direction, thereby allowing the inner peripheral surface of the sprocket wheel to be always pressed to the outer peripheral surface of the axle and said outer ring is attached to the axle by said fixing means in a manner to be radially movable, though immovable in the rotating direction of the axle.

Under such arrangement, impacts applied to the sprocket wheel are damped and broadly distributed over that area of the surface of the axle defined by the width of the sprocket wheel, so that the axle can sufficiently withstand the impact, even if it consists of a thin-walled hollow cylinder. BRIEF EXPLANATION OF THE DRAWINGS FIG. 1 is a side view of an endless-belt traction vehicle embodying this invention, partly broken away;

DESCRIPTION OF THE PREFERRED EMBODIMENTS

Figure 1:
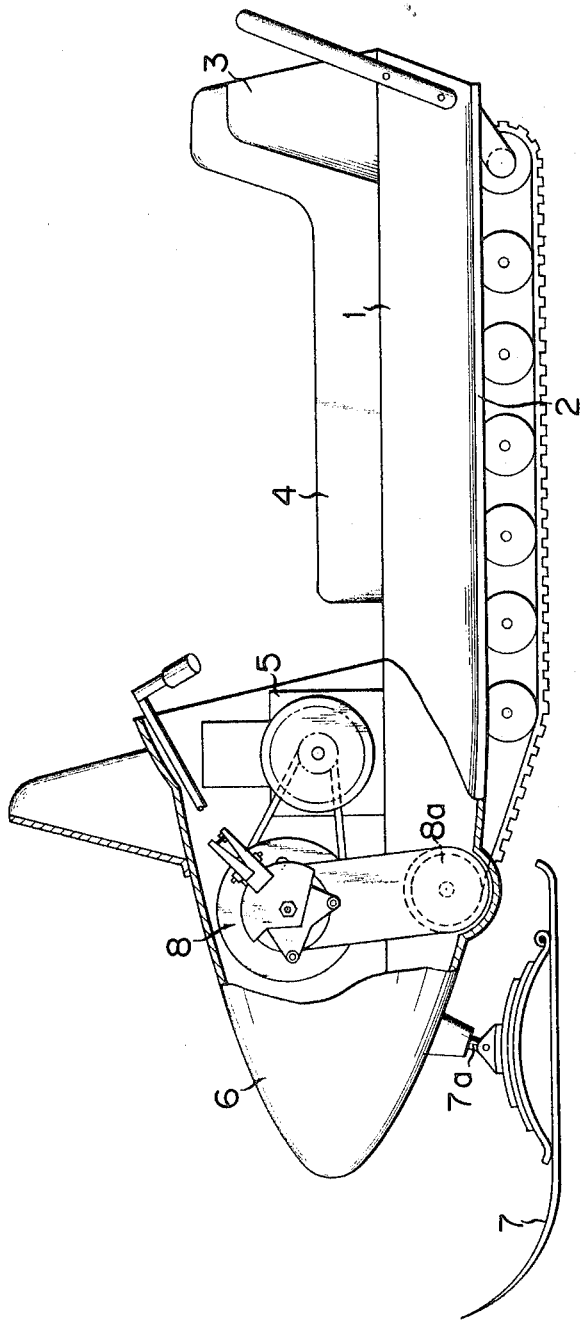

FIG. 1 illustrates the whole of an endless-belt traction vehicle embodying this invention which is mainly used on the snow. Said vehicle has an inverted channel-shaped frame 1 which is provided with a pair of sheath-shaped steps 2 formed at the sides thereof. On the rear portion of said frame 1 is disposed a fuel tank 3. A long seat 4 is positioned on the frame 1 with its rear end covering the fuel tank 3. An engine 5 is located at the front end portion of the frame 1 and shielded by a conical cover 6 attached to the front end portion of the frame 1. A pair of skis 7 are positioned under the front end of the frame 1 in a manner to be supported by their legs 7a extending from the front bottom of the frame 1. A transmission device 8 is almost covered by said conical cover 6 and disposed on the frame 1 in association with said engine 5. A final transmitting sprocket wheel 8a of said transmission device is secured to a driving axle 9 rotatably carried on the bearings 10 attached to the sidewall of the frame 1 and a chain housing 11. Said driving axle 9 preferably consists of a hollow cylinder 9a and two necked pieces 9b are rotatably inserted into the bearings 10 respectively.

A sprocket wheel 12 has an axial bore 12a and sprocket teeth 12b, and is positioned at the middle portion of the axle 9 securely inserted into said bore 12a. An endless track belt 13 of rubber or the like material has openings 13a which are serially arranged in a row along the length of said belt 13 and are interlocked with said teeth 12b.

Said sprocket wheel 12 involves an outer ring 12c having the sprocket teeth 12b formed on the periphery thereof, and an inner ring 12d having the axial bore 12a penetrating the center thereof. Said outer ring 12c is wholly made of wear resistant elastomeric material having a sufficiently great rigidity to endure loads applied when the endless track belt 13 is driven. In this embodiment, said outer ring 12c is preferably made of rigid elastomeric resin having full ice-repellence and wear resistance, for example, of polyurethane having a hardness of 95°±3° as measured by a durometer. Said inner ring 12d is wholly made of natural or synthetic elastomeric resin having a sufficient flexibility to absorb impacts applied thereto in a substantially radial direction, thereby allowing the inner peripheral surface of said bore 12a to be always pressed to the outer surface of the axle 9. In this embodiment, said inner ring 12d is preferably made of soft rubber having a hardness of 70°±5° as measured by a durometer.

As a result, the sprocket wheel 12 is constructed in the best form for utilizing the quality of material involved by causing the outer ring 12c to share the forces to drive the endless track belt, and the inner ring 12d to share impacts transmitted to the sprocket wheel from the ground.

Said sprocket wheel 12 is attached to the axle 9 by fixing means involving coupling members 14. Each of said coupling members 14 consists of a disk-shaped stationary mounting member 14a fixedly secured to the axle 9 at one side of the sprocket wheel 12, a disk-shaped adjustable mounting member 14b removably secured to the axle 9 at the other side of the sprocket wheel 12 and four bolt-nut assemblies 14c. Further, the sprocket wheel 12 is provided with four hollow cylindrical spacers 15 corresponding to said bolt-nut assemblies 14c respectively and fitted in the outer ring in a manner to extend from side to side thereof and be spatially disposed along a circular line defined around the center thereof. Each of said stationary and adjustable mounting members 14a and 14b is provided with four apertures 16 each of which corresponds to each of the spacers 15 and extends in cross section in the radial direction of the axle of the sprocket wheel 12. Into each of said apertures 16 is introduced each of said spacers 15 in a manner to allow its end portion to be radially moved therein. The bolt 14d of each of the bolt-nut assemblies 14c extends through the spacer 15 and bridges both disk-shaped mounting members 14a and 14b. Between the mounting member 14a or 14b and the outer ring 12c exists a slight clearance so as to allow the outer ring 12c to be movable between the mounting members 14a and 14b. Accordingly, the spacer 15 is positioned between both mounting members 14a and 14b, and the nut 14e of each of the bolt-nut assemblies 14c and the head of the bolt 14d thereof are slidably engaged with the edges defined by the apertures 16 so that the outer ring 12c, viz. the sprocket wheel 12 is disposed on the axle 9 in such a manner that any periphery of the wheel is radially movable by elastically deforming the inner ring 12d as well as the outer ring 12c, though immovable in the rotating direction of the axle. In this case, the sprocket wheel will preserve a sufficient flexibility to absorb impacts through the wall of the inner ring so as to prevent the axle 9 and frame 10 from being damaged.

Furthermore, since impacts applied to the sprocket wheel 12 are broadly distributed over that area of the surface of the axle 9 substantially defined by the width of the inner ring 12d, i.e. the inner surface of the axial bore 12a, the axle 9 can sufficiently withstand the impact, even if it consists of a thin-walled hollow cylinder as illustrated in the drawings, and prevent the impact from being concentrated only at portions of the mounting members 14a and 14b at which they are attached to the axle.

Figure 5:
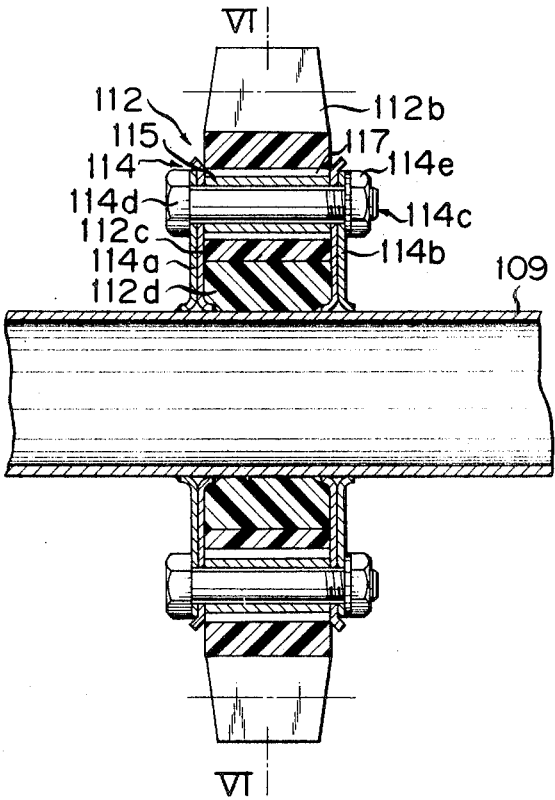
FIG. 5 is an enlarged cross-sectional view of the main part of another embodiment of said endless-belt traction vehicle.
Figure 6:
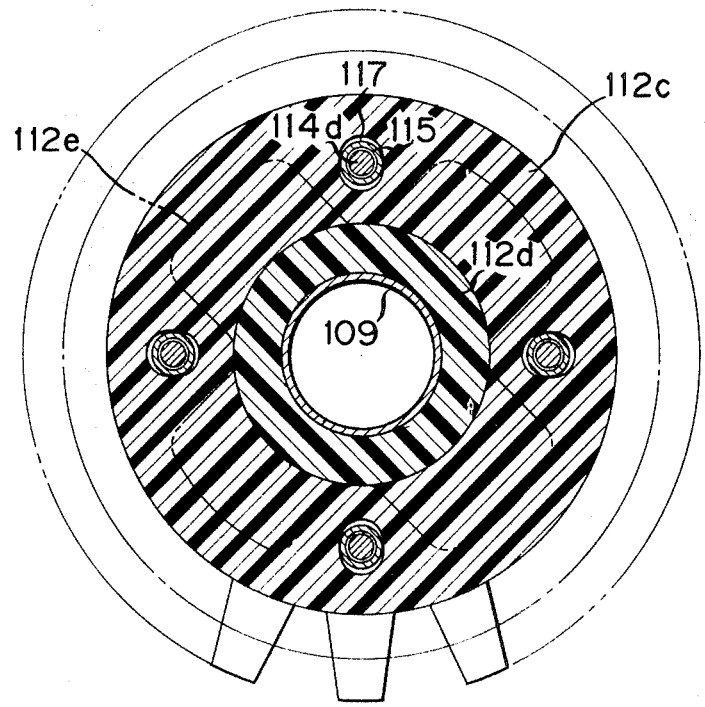
FIG. 6 is a cross sectional view of the main part taken along a line VI-VI of FIG. 5.

FIGS. 5 and 6 indicate another fixing means. Said fixing means involves coupling members 114 each of which consists of a dish-shaped stationary mounting member 114a fixedly secured to the axle 109 at one side of the sprocket wheel 112, a dish-shaped adjustable mounting member 114a removably secured to the axle 109 at the other side of the sprocket wheel 112 and four bolt-nut assemblies 114c. Further, the sprocket wheel 112 is provided with four hollow cylindrical spacers 115 corresponding to said bolt-nut assemblies 114c respectively. Said spacers 115 are loosely inserted into apertures 117 formed in the outer ring 112c in a manner to extend from side to side thereof, and be spatially disposed along a circular line defined around the center thereof. Each of said apertures 117 extends in cross section in the radial direction of the axle of the sprocket wheel 112. Into each aperture 117 is introduced each spacer 115 in a manner to be radially movable therein. The spacer 115 is clamped between both disk-shaped mounting members 114a and 114b by passing through the spacer 115 the bolt 114d of each of the bolt-nut assemblies 114c and progressively screwing the nut 114e of each of the bolt-nut assemblies 114c to its bolt 114d so that said sprocket wheel 112 is secured to the axle 109 by bridging both mounting members 114a and 114b by said bolt-nut. In this case, between the mounting member 114a or 114b and the outer ring 112c exists a slight clearance so as to allow the outer ring 112c to be movable between the mounting members 114a and 114b.

Such arrangement has the same technical effects as those realized by the first-mentioned embodiment.

Said outer ring 112 c and inner ring 112d are annularly formed as shown in the first-mentioned embodiment. If necessary, said rings 112c and 112d may be provided with mutually engaged concave and convex respectively, which are indicated in a dotted line by the reference numeral 112e in FIG. 6. Such constructions will result in an improved impact-absorbability of said wheel and low-cost manufacture thereof, because of the reduction of bulk and weight of the outer ring, the material of which is generally appraised at a high cost.

In these embodiments, driven sprocket wheels 212, though not illustrated in details, are of the same construction as the driving sprocket wheel 12, so that a detailed explanation is eliminated for avoiding complications. In contrast, either one of the driving and driven sprocket wheels may be of the same construction as the above-mentioned wheel 12 or 112.

Figure 2:
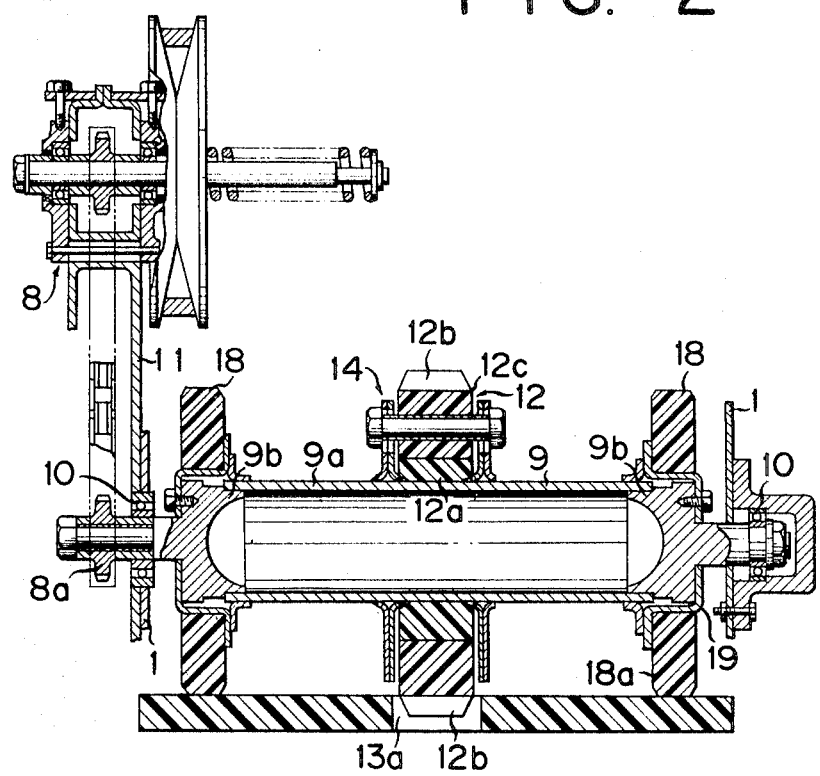
FIG. 2 is a cross-sectional view of an endless-belt traction means of said vehicle.
Figure 3:
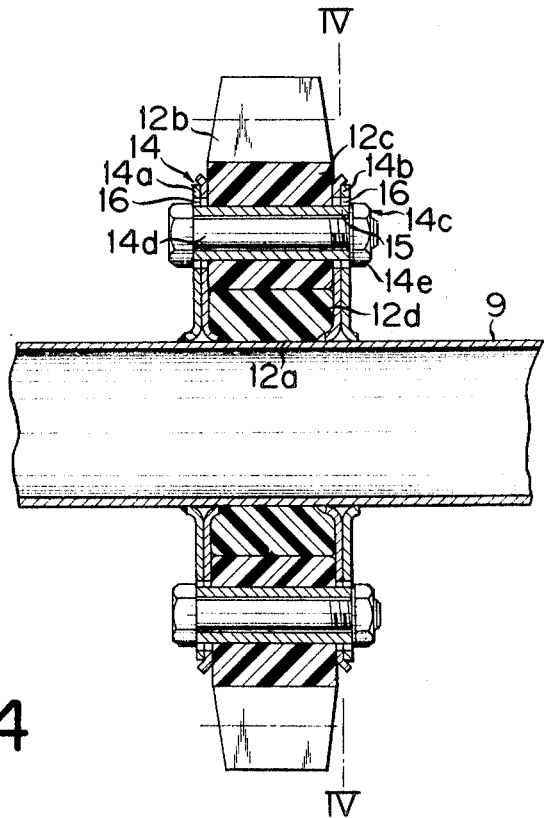
FIG. 3 is an enlarged cross-sectional view of the main part of this invention.
Figure 4:
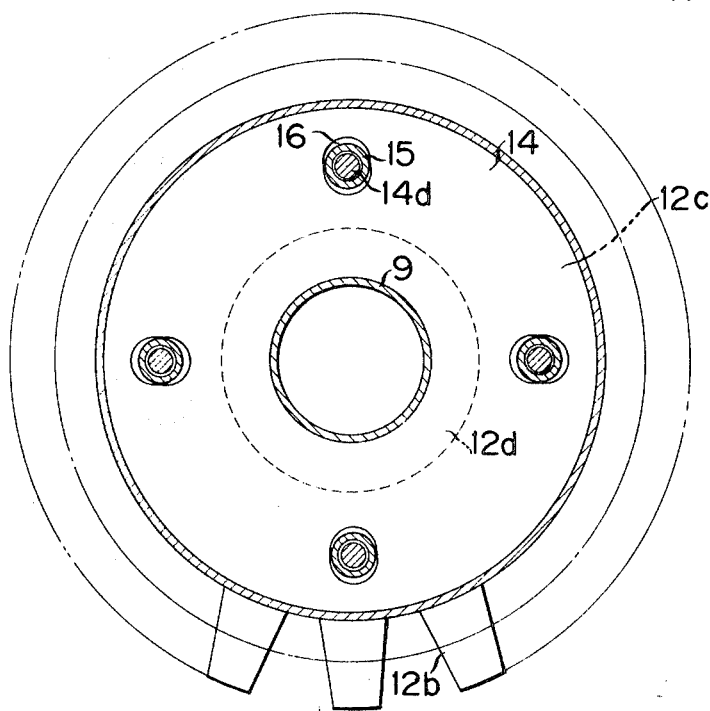
FIG. 4 is a cross-sectional view of the main part taken along a line IV-IV of FIG. 3.

Referring again to FIG. 2, the endless track belt 13 is supported at its edge portions by means of couples of guide wheels 18, each couple of the guide wheels 18 being fixedly secured to the corresponding driving and driven sprocket wheels. One of said guide wheels 18 preferably consists of an annular body 18a of natural or synthetic elastomeric resin, for example, rubber and a cylindrical rim 19. Said guide wheels 18 are attached to the ends of the axle by bolting the rim 19 to the axle 9.

In the arrangements of this invention, the endless-belt traction vehicle may be provided with two endless track belts, of course, with each of them fitted with the corresponding equipment such as a driving sprocket wheel, driven sprocket wheel or wheels, guide wheels, and driving and driven axles.

I claim:

1. An endless-belt traction vehicle comprising at least one endless track belt having openings serially arranged along the length thereof, more than two sprocket wheels interlocked with said belt through said openings, any one of which sprockets can drive said endless track belt, axles fitting in with the axial bores of said sprocket wheels respectively, and means for fixing the sprocket wheels to the axles, characterized in that at least one of said sprocket wheels involves an outer ring of elastomeric resin having a sufficiently great rigidity to endure loads applied when the endless track belt is driven, and an inner ring of natural or synthetic elastomeric resin having more flexibility than that of said outer ring sufficient to absorb impacts applied thereto in a substantially radial direction, thereby allowing the inner peripheral surface of the sprocket wheel to be always pressed to the outer peripheral surface of the axle and said outer ring is attached to the axle by said fixing means in a manner to be radially movable, though immovable in the rotating direction of the axle.

2. The endless-belt traction vehicle claimed in claim 1 in which said outer ring is provided with spacers fitted therein in a manner to extend from side-to-side of the sprocket wheel and be spatially disposed along a circular line defined around the center thereof, and said fixing means involves coupling members secured to one of said axles, and apertures corresponding to said spacers and formed in a manner to extend in cross section in the radial direction of the axle, said spacers being loosely inserted into said apertures respectively.

3. The endless-belt traction vehicle claimed in claim 2 in which said spacers are respectively formed into a hollow cylinder, and said coupling members consist of a dish-shaped stationary mounting member fixedly secured to the axle at one side of the sprocket wheel, a dish-shaped adjustable mounting member removably secured to the axle at the other side of the sprocket wheel and bolt-nut assemblies, the bolt and nut of each of which are slidably engaged with the edges defined by the corresponding apertures.

4. The endless-belt traction vehicle claimed in claim 1 in which said outer ring has apertures perforated from side to side of the sprocket wheel, spatially disposed along a circular line defined around the center thereof, and extending in cross section in the radial direction of the axle and said fixing means involves coupling members secured to one of said axles, said apertures receiving loosely fitted spacers bridging both coupling members.

5. The endless-belt traction vehicle claimed in claim 4 in which said spacers are respectively formed into a hollow cylinder, and said coupling members consist of a dish-shaped stationary mounting member fixedly secured to the axle at one side of the sprocket wheel, a dish-shaped adjustable mounting member removably secured to that axle at the other side of the sprocket wheel and bolt-nut assemblies, the bolt of each of which extends through the spacer and bridges both mounting members.